United States Patent [19]

Heijnen et al.

[11] Patent Number: 5,017,825

[45] Date of Patent: May 21, 1991

[54] FILTER FOR COLORED ELECTRIC LAMP

[75] Inventors: Godefridus H. C. Heijnen, Vaals; Cornelis A. M. Mulder; Ernest O. W. Van Der Stelt, both of Eindhoven, all of Netherlands

[73] Assignee: U.S. Philips Corporation, New York, N.Y.

[21] Appl. No.: 437,407

[22] Filed: Nov. 15, 1989

[30] Foreign Application Priority Data

Nov. 29, 1988 [NL] Netherlands ........................ 8802938

[51] Int. Cl.[5] ........................ H01J 5/16; H01J 61/40; H01K 1/30; G02B 5/28

[52] U.S. Cl. .................................. 313/112; 313/580; 350/1.6; 350/316

[58] Field of Search ...................... 313/112, 116, 580; 350/314, 316, 1.6

[56] References Cited

U.S. PATENT DOCUMENTS 3,897,140 7/1975 Tuthill .......................... 350/314 X
4,425,527 1/1984 Sichel ................................ 313/112
4,652,789 3/1987 Kawakatsu et al. ............... 313/112
4,659,178 4/1987 Kyogoku ........................ 350/316 X
4,689,519 8/1987 Coms et al. ......................... 313/112
4,701,663 10/1987 Kawakatsu et al. ............... 313/112
4,734,614 3/1988 Kuus ................................. 313/112
4,870,318 9/1989 Csányi et al. .................. 313/112 X

*Primary Examiner*—Sandra L. O'Shea
*Assistant Examiner*—Brian Zimmerman
*Attorney, Agent, or Firm*—Robert J. Kraus

[57] ABSTRACT

The colored electric lamp has a lamp vessel (1) carrying a colored translucent interference filter (12) of alternately $SiO_2$ layers and layers of comparatively high refractive index. In the filter, layers of high refractive index have an optical thickness smaller than $\frac{1}{4}\lambda_0$, while $SiO_2$ layers have an optical thickness larger than $\frac{1}{4}\lambda_0$. An $SiO_2$ layer of 500–900 nm thickness can be present on the filter. The light emitted by the lamp has a higher color saturation and the filter has a better adherence to the lamp vessel than in the case of a lamp comprising a conventional filter having an equal overall thickness of layers of high refractive index.

3 Claims, 1 Drawing Sheet

FILTER FOR COLORED ELECTRIC LAMP

BACKGROUND OF THE INVENTION

The invention relates to a coloured electric lamp provided with a glass lamp vessel sealed in a vacuum-tight manner, an electric element in the lamp vessel and a coloured translucent interference filter of alternating layers of high and of low refractive index on the lamp vessel, the layers of low refractive index mainly consisting of $SiO_2$, which alternating layers have an optical thickness $n \times d$ which is a fraction of the wavelength $\lambda_0$ with maximum reflection. Herein, n is the refractive index of a layer and d is its geometrical thickness.

Such a lamp is known from DE GM 86 00 642.

Due to the fact that the materials used in an interference filter mostly have greatly different properties and one material or both materials can also be greatly different from the material of the lamp vessel in this respect, stresses can occur in an interference filter. These stresses can lead to an insufficient adherence of the filter to the substrate and can even cause the filter to scale off, in which event also splitters can chip off the substrate.

In order to counteract an insufficient adherence of the interference filter, the number of layers of such a filter must be limited. However, a small number of layers yields a less selective filter than a large number of layers. This becomes manifest, for example, in the colour saturation of the light transmitted by the filter.

SUMMARY OF THE INVENTION

The invention has amongst others for its object to provide a lamp of the kind described in the opening paragraph, in which the filter has a satisfactory adherence to the lamp vessel and which during operation nevertheless emits light of a comparatively high colour saturation.

According to the invention, this object is achieved in that layers of high refractive index have an optical thickness $n_n \times d_n$ which is smaller than $\frac{1}{4}\lambda_0$ and layers of low refractive index have an optical thickness $n_1 \times d_1$ which is larger than $\frac{1}{4}\lambda_0$, while the lamp vessel consists of glass having an $SiO_2$ content of at least 95 % by weight.

A lamp vessel of glass having an $SiO_2$ content of at least 95 % by weight has an expansion coefficient which is every low and is very similar to that of the $SiO_2$ layers in the interference filter.

When layers of high refractive index in the filter are made thinner than $\frac{1}{4}\lambda_0$ and the layers of low refractive index are made thickness, a filter with a chosen number of layers, for example 11 layers, has a smaller overall thickness of the material of high refractive index having properties different from those of the substrate material than a filter with the same number of layers of $\frac{1}{4}\lambda_0$ thickness. By the use of these comparatively thin layers of high refractive index, the number of layers can be larger without the overall layer thickness being larger than the than use of layers having a thickness of $\frac{1}{4}\lambda_0$.

The optical layer thicknesses in the interference filter may differ by up to tens of %, for example 40 %, from the optical thickness corresponding to $\frac{1}{4}\lambda\lambda_0$.

It has been found that it is advantageous when an $SiO_2$ layer having a thickness of 500–900 nm is present in the interference filter. The filter then has a very satisfactory adherence to the substrate and the light emitted by the lamp has a very high colour saturation.

Suitable materials of high refractive index are, for example, $Si_3N_4$, $TiO_2$, $ZrO_2$.

As a glass for the lamp vessel, use may be made, for example, of quartz glass or, for example, Vycor, i.e. a glass containing about 98 % by weight of $SiO_2$. The electrical element in the lamp vessel may be a pair of electrodes or a filament. The lamp vessel may have a halogen-containing gas filling.

The lamp according to the invention, when provided with a filter transmitting yellow light, may be used, for example, as a car headlight lamp.

Figure 1:
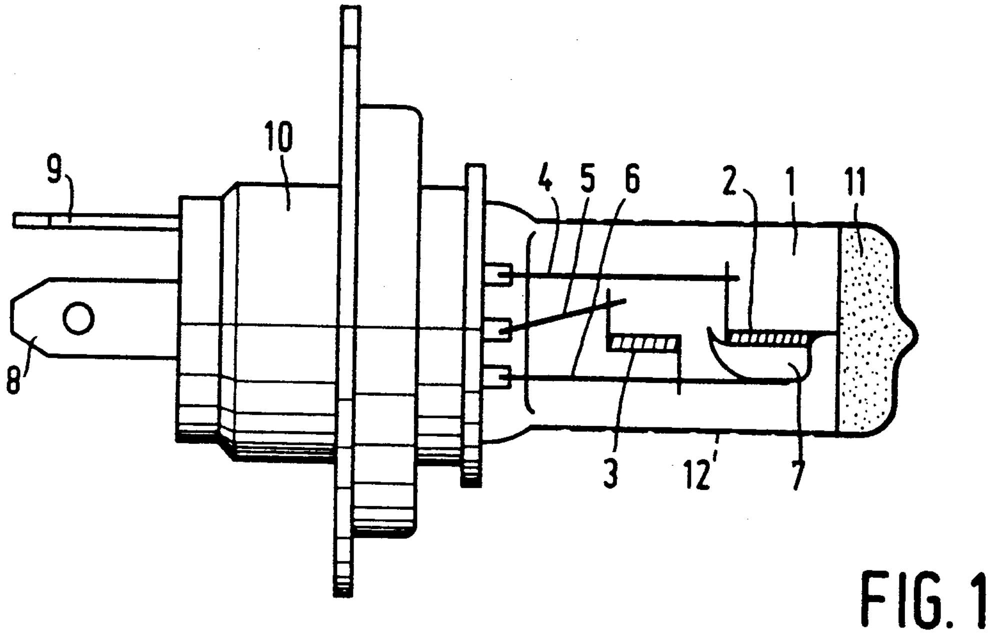
FIG. 1 of the drawing shows an embodiment of the lamp, according to the invention, in side elevation.

In the drawing, the lamp has a quartz glass lamp vessel 1. Two filaments 2, 3 are arranged in the lamp vessel between current supply conductors 4, 5, 6, a filament 2 cooperating during operation with a screen 7 and producing a dipped beam when the lamp is arranged in a headlight, while the other filament 3 then produces a main beam. The current supply conductors are connected to a respective contact tongue 8, 9 of the lamp cap 10, of which two are visible in the drawing. The lamp vessel has at its free end a non-transparent coating 11. A filter 12 transmitting yellow light on the outer surface of the lamp vessel 1 is indicated by a dotted line. The filter is an interference filter of alternating layers of low and of high refractive index, i.e. $SiO_2$ and $Si_3N_4$, The interference filter has the construction shown in Table 1. For comparison, conventional filters are also shown. The wavelength of maximum reflection $\lambda_0$ was 470 nm.

| Layer No. | Invention 1 (U1) | | Conventional 1 (C1) | | Conventional 2 (C2) | |
|---|---|---|---|---|---|---|
| 0 | substrate | | substrate | | substrate | |
| | $Si_3N_4$(nm) | $SiO_2$(nm) | $Si_3N_4$(nm) | $SiO_2$(nm) | $Si_3N_4$(nm) | $SiO_2$(nm) |
| 1 | 21.7 | | 37.9 | | 37.9 | |
| 2 | | 145 | | 79.4 | | 79.4 |
| 3 | 43.4 | | 57.8 | | 57.8 | |
| 4 | | 145 | | 79.4 | | 79.4 |
| 5 | 43.4 | | 57.8 | | 57.8 | |
| 6 | | 145 | | 79.4 | | 79.4 |
| 7 | 43.4 | | 57.8 | | 57.8 | |
| 8 | | 145 | | 79.4 | | 79.4 |
| 9 | 43.4 | | 57.8 | | 57.8 | |
| 10 | | 145 | | 79.4 | | 79.4 |
| 11 | 43.4 | | 37.9 | | 57.8 | |
| 12 | | 145 | | | | 79.4 |
| 13 | 43.4 | | | | 37.9 | |

-continued

| Layer No. | Invention 1 (U1) | | Conventional 1 (C1) | | Conventional 2 (C2) | |
|---|---|---|---|---|---|---|
| 14 | | 145 | | | | |
| 15 | 21.7 | | | | | |
| Overall thickness | 303.8 | 1015 | 307 | 397 | 346.8 | 476.4 |

In these filters, the first layer and the last layer are thinner in order to adapt the filter to the substrate and to the environment, respectively.

The filter according to the invention has $Si_3N_4$ layers having an overall thickness smaller than that of the conventional filters. Nevertheless, the filter has four and two layers more, respectively.

The lamp according to the invention has also made with an $SiO_2$ layer on the filter having a thickness of 560 to 720 nm, $U_2$ and $U_3$, respectively.

The stability of the filter on the lamp vessel was judged after a test according to DIN 50017, in which the lamps pass through five cycles of eight hours at 40° C. and 100 % relative humidity, and 16 hours at 25° C. Subsequently, the adherence of the filter was judged by providing tape on the filter and then removing the tape.

The lamp according to the invention $U_1$, $U_2$ and $U_3$ and the conventional lamp $C_1$ retained a fully whole filter. Of the conventional lamp $C_2$, the filter scaled off.

Of the lamps according to the invention ($U_1$, $U_2$, $U_3$) and of the conventional lamps ($C_1$, $C_2$), the location of the colour point in the C.I.E. colour triangle was determined. For comparison, the conventional lamp $C_1$ was also measured when provided with the same $SiO_2$ layer of 560 and 720 nm, respectively, on the filter ($C_3$ and $C_4$, respectively). The colour points are shown in FIG. 2.

Figure 2:
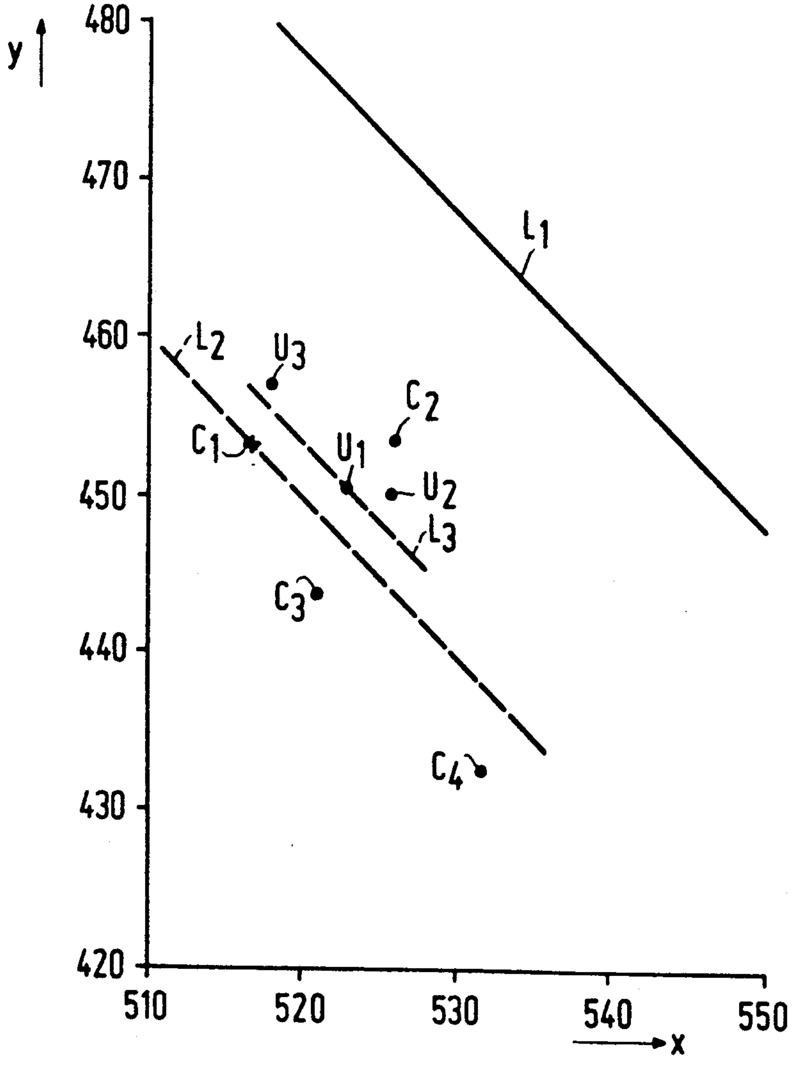
FIG. 2 of the drawing is a graph illustrating the respective color saturations of a variety of lamps.

In FIG. 2 the full line $L_1$ indicates a portion of the righthand edge of the C.I.E. colour triangle. The closer a colour point is to this line, the larger is the colour saturation. The broken line $L_2$ extends parallel to $L_1$. $L_2$ passes through $C_1$, the colour point of the conventional lamp $C_1$. $L_3$ passes parallel to $L_1$ through $U_1$, the colour point of the lamp according to the invention $U_1$.

The colour point $U_1$ is closer to $L_1$ than the colour point $C_1$. $U_1$ therefore has a higher colour saturation. The colour points $U_2$ and $U_3$ of the lamps $U_2$ and $U_3$, respectively, are even closer to $L_1$ and consequently have an even higher colour saturation. The graph shows that the comparatively thick $SiO_2$ layer is of no use for the conventional lamps $C_3$ and $C_4$. Their colour points are further removed from $L_1$ than $C_1$. In all lamps, the point at which the reflection curve of the filter is 50 % of the maximum reflection was situated at 527.5 nm.

We claim:

1. An electric lamp comprising a sealed lamp vessel containing an electric element for emitting radiation and including, disposed on the vessel, an interference filter having alternating layers of respective high and lower refractive indices for selectively passing light of at least one predetermined color and for reflecting back toward the electric element radiation of a wavelength $\lambda_o$, characterized in that:

a. the lamp vessel consists essentially of a glass having a $SiO_2$ content of at least 95% by weight;

b. the layers of high refractive index each have an optical thickness which is substantially smaller than $\frac{1}{4}\lambda_o$; and c. the layers of low refractive index each consist essentially of $SiO_2$ and have an optical thickness which is substantially larger than $\frac{1}{4}\lambda_o$.

2. An electric lamp as in claim 1 including a $SiO_2$ layer having a thickness of about 500 to 900 nm disposed on the interference filter.

3. An electric lamp as in claim 1 where the at least one predetermined color is yellow and where $\lambda_o$ is approximately equal to 470 nm.

* * * * *